April 15, 1930.  G. GRAFF  1,754,855
LIGHT
Filed Nov. 14, 1927  2 Sheets-Sheet 1

Inventor
George Graff

April 15, 1930.　　　G. GRAFF　　　1,754,855
LIGHT
Filed Nov. 14, 1927　　2 Sheets-Sheet 2
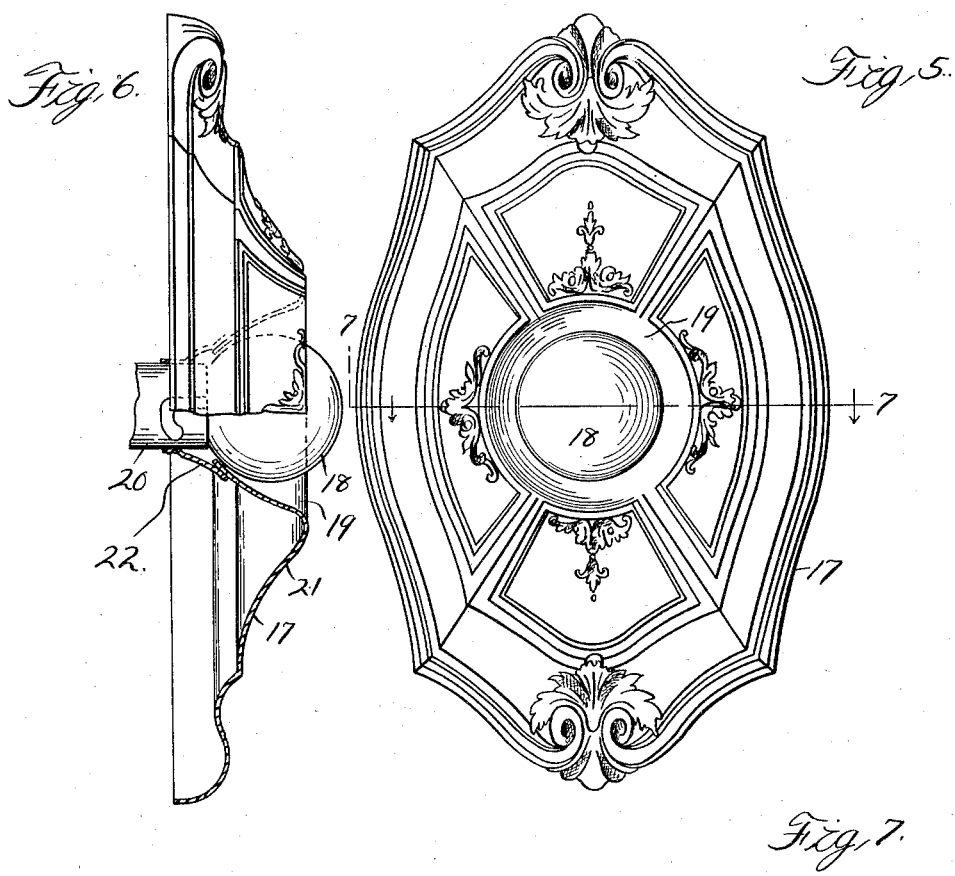
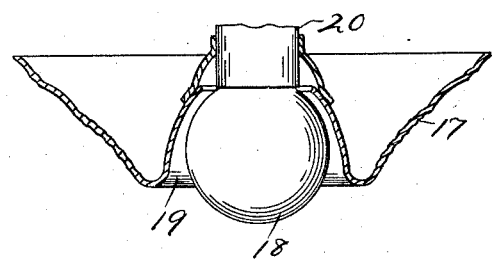
Inventor
George Graff, Patented Apr. 15, 1930

1,754,855

UNITED STATES PATENT OFFICE

GEORGE GRAFF, OF TOLEDO, OHIO, ASSIGNOR, BY MESNE ASSIGNMENTS, TO THE DURA COMPANY, OF TOLEDO, OHIO, A CORPORATION OF OHIO

LIGHT

Application filed November 14, 1927. Serial No. 233,156.

The invention relates to lights and refers more particularly to lights for the interiors of vehicle bodies. One of the objects of the invention is to so construct the light that it may be cheaply manufactured and present a neat and pleasing appearance. With this and other objects in view, the invention resides in the novel features of construction and combinations and arrangements of parts as more fully hereinafter set forth.

In the drawings:—

Figure 1:
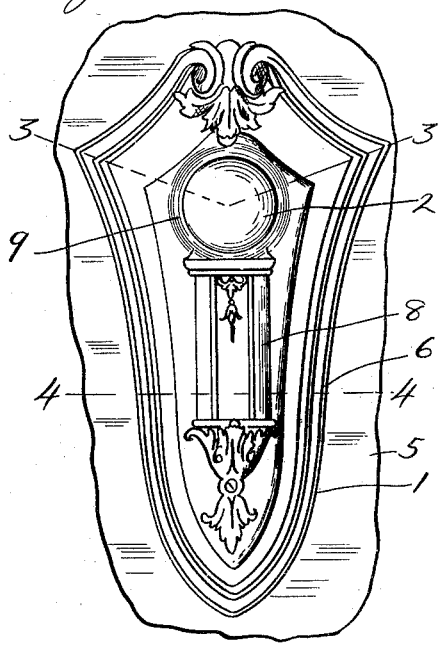
Figure 1 is a front elevation of a portion of the interior of a vehicle body having applied thereto a light embodying my invention.
Figure 2:
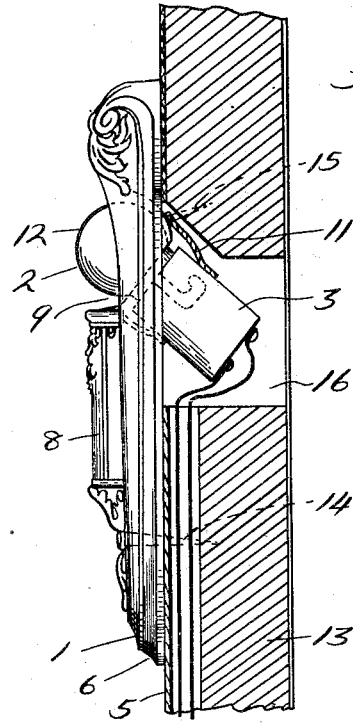
Figure 2 is a side elevation of the light showing the supporting post therefor in section.
Figure 3:
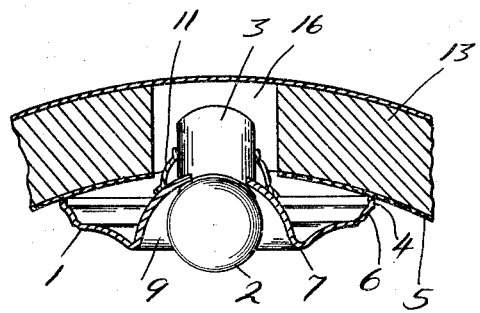
Figure 4:
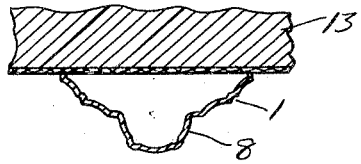

Figures 3 and 4 are cross sections, respectively, on the lines 3—3 and 4—4 of Figure 1;

Figure 5 is a bottom plan view of a modified light;

Figure 6 is a sectional elevation thereof;

Figure 7 is a cross section on the line 7—7 of Figure 5.

The light is designed particularly for the interiors of vehicle bodies and as shown in Figures 1, 2, 3 and 4 is a side wall or corner light which comprises the body 1 which is preferably stamped from sheet metal, the light bulb 2 extending within a recess formed in the body 1 and the bulb socket 3 which projects rearwardly beyond the body. The periphery 4 of the light body is in the one plane so that it may be easily clamped against the lining 5 of the vehicle body. Projecting forwardly from the periphery 4 is the continuous marginal portion 6 of the light body and projecting forwardly from this continuous marginal portion is the continuous bead 7, which is laterally inset from the marginal portion. The lower portion of the light body has the vertically extending column 8 which merges into the lower portion of the bead 7. The upper portion of the light body, however, has the recess or concavity 9 which is formed by the upper end of the column 8 and the upper portion of the continuous bead 7. 2 is the light bulb extending within the recess 9 and having its forward portion projecting forwardly beyond the bead 7. This light bulb is mounted in the socket 3 which latter extends downwardly and rearwardly and is secured to the light body by means of the thimble 11.

The light body being stamped from sheet metal may be highly ornamental and the wall of its recess or concavity may be plain and highly polished to form a good reflecting surface. The forward portion of the light bulb 2 preferably is ornamented as at 12 to assist in presenting a neat and pleasing appearance and also to diffuse the light.

As shown, the light is secured to the post 13 of the vehicle body by means of the screws 14 and 15, the head of the screw 14 fitting in with the general ornamental scheme. The head of the screw 15 being located at the bottom of the recess or concavity 9 is concealed by the light bulb. The post 13 has the recess 16 for receiving the socket 3 and the wires leading from the socket.

The modification shown in Figures 5, 6 and 7 is also a wall light, but, more specifically, a dome light for a vehicle body. The construction of this dome light is very similar to that of the wall or corner light it having the body 17 which is stamped from sheet metal, the light bulb 18 extending within the recess or concavity 19 formed in the body and the socket 20 which extends beyond the rear or upper side of the body and into a suitable recess formed in one of the cross bars of the top of the vehicle body. The light body 17 has its periphery in the one plane and is formed with the forwardly or downwardly extending portion 21 in which is formed the recess 19. The light bulb 18 extends forwardly or downwardly beyond the portion 21 and the exposed end of this light bulb is preferably ornamented with the same designs as the light body to increase the general ornamental effect, as well as diffuse the light. The socket 20 is secured to the light body as by means of the thimble 22 which is fixedly secured to the wall forming the recess 19. The surface of the wall forming the recess is preferably polished to reflect the light.

From the above dscription it will be seen that I have provided a simple construction of light which may be cheaply manufactured and which will take a highly ornamental appearance owing to the fact that the light body is stamped from sheet metal. It will also be seen that the light body may be readily secured in place and clamped against the lining of the vehicle body.

What I claim as my invention is:

1. A light for the interior of vehicle bodies comprising a shallow stamped sheet metal body having a peripheral portion adapted for engagemnet with the vehicle body, the body having a portion projecting forwardly beyond its periphery and formed with a forwardly opening recess, a light bulb substantially housed within said recess, and a socket for the bulb projecting rearwardly beyond the periphery of the body.

2. A light for the interior of vehicle bodies comprising a shallow stamped sheet metal body having a peripheral portion adapted for engagement with the vehicle body, the body having a portion projecting forwardly beyond its periphery and formed with a forwardly opening recess, a light bulb substantially housed within said recess, said body being provided with forwardly extending combined ornamental and bulb protecting portions about said recess, and a socket for the bulb projecting rearwardly beyond the periphery of the body.

3. A light for the interior of vehicle bodies comprising a shallow stamped sheet metal body having a peripheral portion adapted for engagement with the vehicle body, the body having a portion projecting forwardly beyond its periphery and formed with a forwardly opening recess, a light bulb substantially housed within said recess, a thimble secured to said body and projecting rearwardly beyond the preiphery thereof, and a socket for said bulb received in said thimble.

In testimony whereof I affix my signature.

GEORGE GRAFF.